United States Patent
Twork et al.

(10) Patent No.: US 8,020,345 B2
(45) Date of Patent: Sep. 20, 2011

(54) METHODS AND APPARATUS FOR SUPPORTING A WINDOW GLASS LIFT PLATE

(75) Inventors: Michael Twork, White Lake, MI (US);
James S. Coleman, Rochester, MI (US);
Shawn Filipowicz, Clarkston, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 1064 days.

(21) Appl. No.: 11/779,952

(22) Filed: Jul. 19, 2007

(65) Prior Publication Data

US 2009/0021045 A1  Jan. 22, 2009

(51) Int. Cl.
*E05F 11/38* (2006.01)

(52) U.S. Cl. .............. 49/348; 49/349; 49/374; 49/502

(58) Field of Classification Search ............ 49/374, 49/372, 375, 502, 348, 349, 506
See application file for complete search history.

(56) References Cited

U.S. PATENT DOCUMENTS

| | | | | |
|---|---|---|---|---|
| 5,379,553 A | * | 1/1995 | Kimura et al. | 49/502 |
| 6,151,847 A | * | 11/2000 | Okuniewicz et al. | 52/204.591 |
| 6,330,764 B1 | * | 12/2001 | Klosterman | 49/375 |
| 6,640,497 B2 | * | 11/2003 | Sakaguchi et al. | 49/352 |
| 6,663,165 B2 | | 12/2003 | Naito et al. | |
| 7,246,465 B2 | * | 7/2007 | Staser | 49/502 |
| 2006/0037250 A1 | * | 2/2006 | Staser | 49/502 |
| 2008/0122263 A1 | * | 5/2008 | Waroch et al. | 296/201 |
| 2009/0307977 A1 | * | 12/2009 | Mangold et al. | 49/70 |

* cited by examiner

*Primary Examiner* — Gregory J. Strimbu
*Assistant Examiner* — Catherine A Kelly
(74) *Attorney, Agent, or Firm* — Matthew B. Dernier, Esq.; Gibson & Dernier LLP

(57) ABSTRACT

A door module of a vehicle includes: a panel of door glass including an upper peripheral edge and a lower peripheral edge; a lift plate coupled to the lower peripheral edge of the door glass such that a regulator may move the door glass between a full-up position and a full-down position within the door module via the lift plate; and a position block movable within the door module to: (i) a first position below the lift plate such that the lift plate rests on the position block and the door glass is at a position above the full-down position when the door glass is inserted into the lift plate during manufacture, and (ii) after such insertion, a second position that permits the lift plate to move further downward such that the door glass is at the full-down position.

8 Claims, 4 Drawing Sheets

METHODS AND APPARATUS FOR SUPPORTING A WINDOW GLASS LIFT PLATE

BACKGROUND OF THE INVENTION

The present invention relates to methods and apparatus for supporting a window glass lift plate, such as during manufacture and/or transport.

Use of regulators (e.g., rail-less regulators) for moving window glass up and down poses an inherent problem in that the only position that the lift plate (the plate that connects the lift mechanics to a lower edge of the door glass) can be parked for shipment to the vehicle manufacturer is the full-down position. This is so because the full-down position is the only known position that is sufficiently repeatable during manufacture, and thus provides a guarantee as to the position of the lift plate for the manufacturer. For an application with a full glass drop this is problematic, particularly when using snap glass. Indeed, with a full drop glass design, the glass goes all the way down into the door module during a window opening operation (with the top edge at or below the belt line). During manufacture of an automobile with such a design, the glass is inserted through a slot at the top of the door module, and down to the lift plate where it should be clamped.

The insertion of window glass into the lift plate during manufacture is not necessarily a repeatable operation, as there is usually inconsistency in the position of the window glass relative to the lift plate. Indeed, human error during insertion of the window glass, variation in the placement and adjustment of clamps or other mechanisms used for securing the window glass to the lift plate, etc. contribute to such inconsistency. If the manufacturer fails to install the window glass correctly on the first attempt (i.e., getting the lower edge of the window glass into the lift plate), it is difficult to get the top edge of the glass back above the belt-line to make a second attempt at installation.

Unlike the rail-less design, single and dual rail applications can park the lift plate(s) at a customer specified height—such that the top edge of the glass is above the beltline during manufacture and the lower edge of the glass plate can be moved into the lift plate (with multiple attempts if needed). Typically, there is a round access hole in the door module carrier that is aligned with the interface of the glass and the lift plate at the park position.

SUMMARY OF THE INVENTION

One or more embodiments of the invention are directed to methods and apparatus for positioning a lift plate for shipping and/or installation of window glass during vehicle manufacture.

According to one or more aspects of the invention, a lift plate is parked, even if temporarily, at a position other than full-down, which will facilitate the window glass installation into the door module. The preferred position is about 3-6 inches above full-down. One or more embodiments of the invention employs a position block that temporarily raises the park position of the lift plate until the window glass is loaded. The door module may be shipped to the vehicle manufacturer with the position block in place so that the window glass may be inserted after shipment. The design of the position block and the carrier are such that after installation and raising of the glass, the position block is pulled into an access hole in an inner panel of the door module and/or the carrier where it seals the access hole.

In accordance with one or more embodiments of the invention, a door module of a vehicle includes: a panel of door glass including an upper peripheral edge and a lower peripheral edge; a lift plate coupled to the lower peripheral edge of the door glass such that a regulator may move the door glass between a full-up position and a full-down position within the door module via the lift plate; and a position block movable within the door module to: (i) a first position below the lift plate such that the lift plate rests on the position block and the door glass is at a position above the full-down position when the door glass is inserted into the lift plate during manufacture, and (ii) after such insertion, a second position that permits the lift plate to move further downward such that the door glass is at the full-down position.

The door module may include an outer panel and an inner panel, the inner panel including an aperture through which a user manipulates the position block. The position block may include a handle operable to facilitate the manipulation by the user, the handle being sized and shaped to extend through the aperture. The position block may also include a sealing element operable to mate with and seal the aperture when in the second position. By way of example, the sealing element may be a resilient flange that is larger than the aperture and through deformation is operable to engage and seal the aperture.

The position block and the aperture are sized and shaped such that at least one orientation of the position block relative to the aperture results in an unobstructed portion of the aperture, which permits access into a volume between the inner and outer panels of the door module. Conversely, the position block and the aperture are sized and shaped such that the second position of the position block relative to the aperture results in a full obstruction of the aperture.

The position block may include: a base having first and second surfaces defining a height, and third and fourth surfaces defining a width; and a sealing element extending from the base, wherein: the height of the base is sized and shaped to support a lift plate for the door glass at a position above a full-down position when the door glass is inserted into the lift plate during manufacture, when the position block is in a first position, and the a sealing element is sized and shaped to mate with and seal an aperture in the door module when in a second position.

One or more methods of the invention may include: locating a position block within a door module of a vehicle in a first position such that the block supports a lift plate for door glass at a position above a full-down position; inserting the door glass into the lift plate during manufacture when the position block is in the first position; and thereafter, moving the position block to a second position that permits the lift plate to move further downward such that the door glass is at the full-down position.

The step of moving the position block to the second position may be carried out by a user manipulating the position block through an aperture in an inner panel of the door module. The methods may further include sealing the aperture by maneuvering a sealing element of the position block into the aperture when the position block is in the second position.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
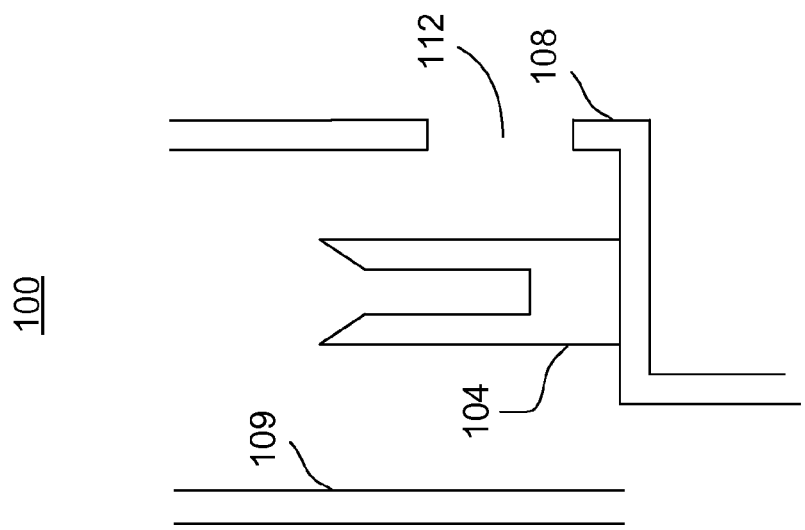
Figure 3:
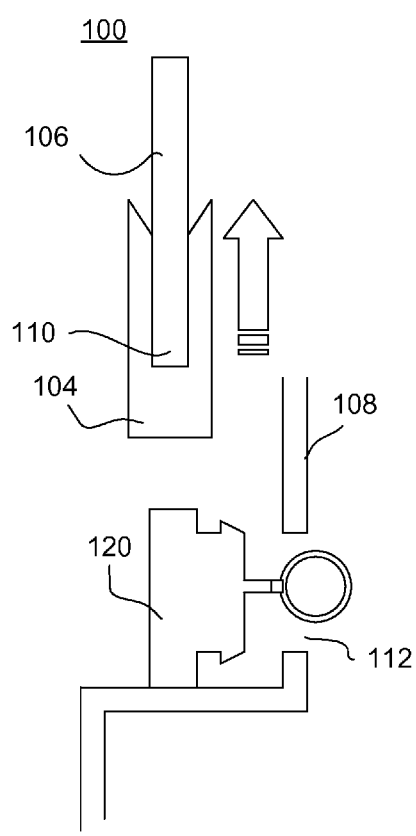

Reference is now made to FIGS. 1-4, which are side-elevational views of a door module 100 in which a lift plate 104 is supported using a position block 120 in an intermediate position (between full-down and full-up) during installation of window glass 106. FIG. 1 illustrates a full-down position of the lift plate 104 within the door module 100 such that the lift plate 104 bottoms out against a surface of an inner panel 108 or carrier of the door module 100. The lift plate 104 is located within the door module 100 between the inner panel 108 and an outer panel 109. As discussed above, with a full drop glass design as illustrated, the glass 106 goes all the way down into the door module 100 during a window opening operation (with the top edge of the glass 106 at or below the belt line). Thus, if the manufacturer attempts to insert the glass 106 into the lift plate 104 while in this orientation, and fails to install the window glass 106 correctly on the first attempt, it is difficult to get the top edge of the glass 106 back above the belt-line to make a second attempt at installation.

Figure 2:
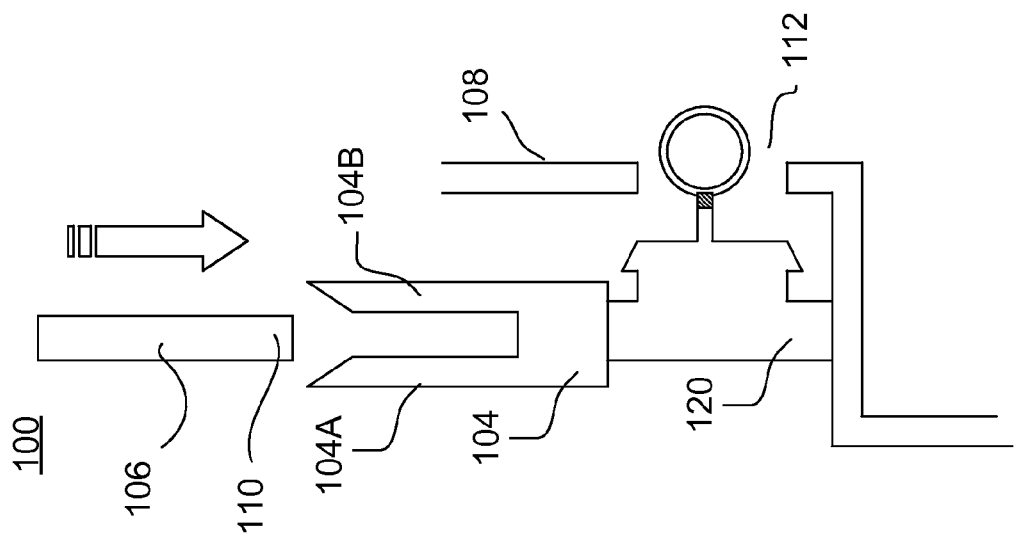
FIGS. 1-4 are side-elevational views of a door module in which a lift plate is supported using a position block in an intermediate position (between full-down and full-up) during window glass installation.

As best seen in FIG. 2, the position block 120 is located within the door module 100 in a first position such that the block 120 supports the lift plate 104 at a position above the full-down position (of FIG. 1), but not at the full-up position. Next, the door glass 106 is inserted into the lift plate during manufacture. The lift plate 104 may include a pair of walls (or a plurality of spring fingers) 104A, 104B that define an opening 104C into which a bottom edge 110 of the window glass 106 may be inserted.

Figure 4:
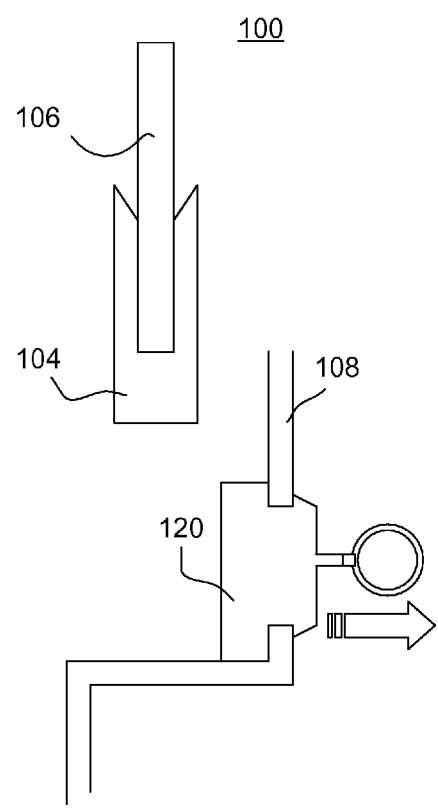

After the window glass has been inserted into the lift plate 104, the lift plate 104 is moved upward from the intermediate position and the position block 120 is moved to a second position (see FIG. 4). The second position of the position block 120 permits the lift plate 104 to move further downward from the intermediate position, to or toward the full-down position. The step of moving the position block 120 to the second position may be carried out by a user manipulating the position block 120 through an aperture 112 in the inner panel (or carrier) 108 of the door module 100. As will be discussed in more detail below, the aperture 112 is preferably sealed by maneuvering a sealing element 140 of the position block 120 into the aperture 112 when the position block 120 is in the second position.

Figure 5:
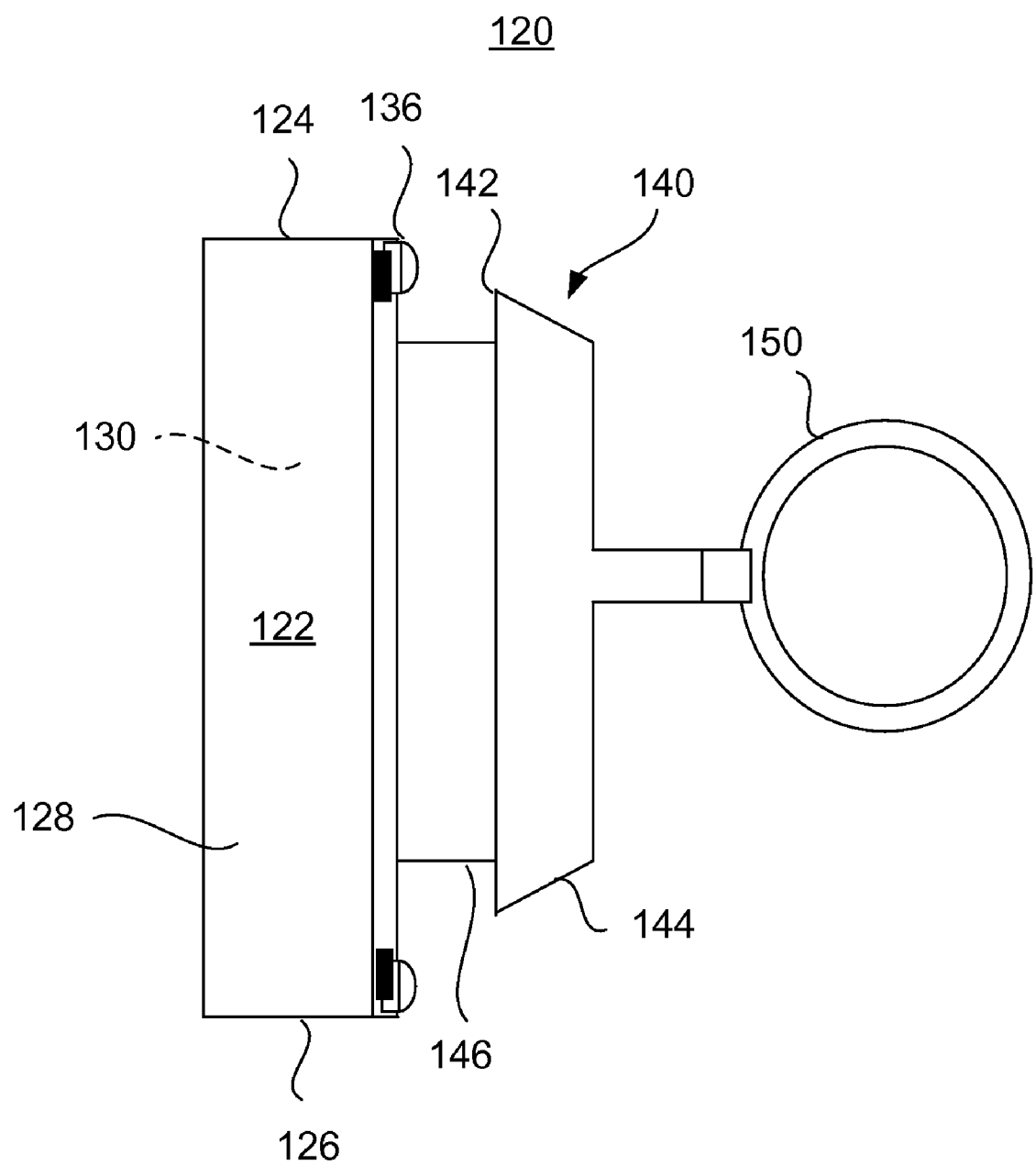
FIG. 5 is a side-elevational view of the position block of FIGS. 2-4.

Reference is now made to FIG. 5, which is a side-elevational view of the position block 120. The position block includes a base 122, the sealing element 140 and a handle 150. The base 122 includes first and second surfaces 124, 126 defining a height, and third and fourth surfaces 128, 130 defining a width. The sealing element 140 extends from a front surface of the base 122. The height of the base 122 is sized and shaped to support the lift plate 104 at the intermediate position above the full-down position when the position block 120 is in the first position. As will be discussed in more detail below, the width of the position block 120 is preferably sized to achieve other useful functions. The base 122 of the position block 120 is preferably formed from a suitable material, such as nylon.

The sealing element 140 may be integrally formed with the base 122 or, as illustrated, the sealing element 140 may be coupled to the base 122 via suitable fasteners 136. The illustrated embodiment permits the base 122 and the sealing element 140 to be formed from different materials if desired. For example, the sealing element may be formed from a resilient material (or at least a material of differing resiliency) as compared with the base 122. A suitable material for the sealing element 140 is a thermoplastic elastomer, such as SANTOPRENE™, which is available from Advanced Elastomer Systems, Farmington Hills, Mich.

The sealing element 140 is preferably sized and shaped to mate with and seal the aperture 112 in the door module 106 when in the second position. The sealing element 140 preferably includes a resilient flange 142 that includes a larger periphery than the periphery of the aperture 112. Through deformation, the resilient flange 142 is preferably operable to engage and seal the aperture 112. By way of example, the resilient flange 142 may include a sloped surface 144 that circumscribes the flange 142. A forward edge of the sloped surface 144 may have a periphery that is smaller than the periphery of the aperture 112, while a rearward edge of the sloped surface 144 may have a periphery that is larger than the periphery of the aperture 112. When the resilient flange 142 is deformed and passes through the aperture 112, the periphery of the aperture 112 is preferably engaged by an undercut 146 of the sealing element 140.

The handle 150, in this example a ring, may extend from the sealing element 140 to facilitate manipulation of the position of the position block 120 by the user through the aperture 112.

Figure 6A:
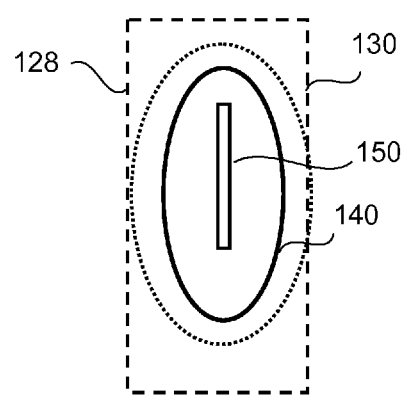
FIGS. 6A-6B are elevational views of the position block viewed through an access aperture in an inner panel or carrier of the door module.
Figure 6B:
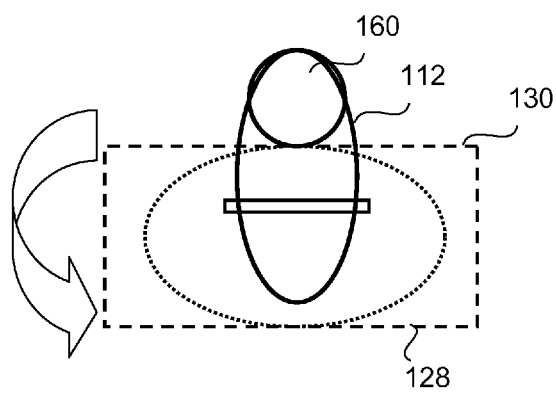

Reference is now made to FIGS. 6A-6B, which are elevational views of the position block 120 viewed through the access aperture 112. The position block 120 and the aperture 112 are preferably sized and shaped such that at least one orientation of the position block 120 relative to the aperture 112 results in an unobstructed portion 160 of the aperture 112. This unobstructed portion 160 of the aperture 112 permits access into a volume between the inner and outer panels of the door module 100, for example to inspect the interconnection of the window glass 106 and the lift plate 104.

The aperture 112 preferably includes a height and width, one of which is substantially larger than the other. Similarly, the position block 120 includes the height and width, one of which may be substantially larger than the other. In the illustrated example, the heights are larger than the respective widths. By way of example, the aperture 112 may have an oval shape—which is complemented by the sealing element 140 also having an oval shape. With the oval shape, the width of the block 120 may be aligned with the height of the aperture 112 to achieve the unobstructed portion 160 of the aperture 112.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A door module of a vehicle, comprising:
an outer panel and an inner panel;

a panel of door glass located between the outer and inner panels and including an upper peripheral edge and a lower peripheral edge;

a lift plate coupled to the lower peripheral edge of the door glass such that a regulator may move the door glass between a full-up position and a full-down position within the door module via the lift plate; and a position block movable within the door module to: (i) a first position below the lift plate such that the lift plate rests on the position block and the door glass is at a position above the full-down position when the door glass is inserted into the lift plate during manufacture, and (ii) after such insertion, a second position that permits the lift plate to move further downward such that the door glass is at the full-down position, wherein the inner panel includes an aperture through which a user can manipulate the position block, and the position block includes a sealing element which mates with and seals the aperture when in the second position.

2. The door module of claim 1, wherein the position block includes a handle operable to facilitate the manipulation by the user, the handle being sized and shaped to extend through the aperture.

3. The door module of claim 1, wherein the sealing element is a resilient flange that is larger than the aperture and through deformation is operable to engage and seal the aperture.

4. The door module of claim 1, wherein the position block comprises:

a base having first and second surfaces defining a height, and third and fourth surfaces defining a width; and the sealing element extending from the base, wherein:

the height of the base is sized and shaped to support, from below, the lift plate for the door glass at the position above the full-down position when the door glass is inserted into the lift plate during manufacture, when the position block is in the first position, and the sealing element is sized and shaped to mate with and seal the aperture in the inner panel when in the second position.

5. The door module of claim 4, wherein the base permits the lift plate to move further downward to the full-down position when the position block is in the second position.

6. The door module of claim 4, wherein the position block includes a handle extending from the sealing element and operable to facilitate manipulation by the user through the aperture.

7. The door module of claim 4, wherein the sealing element is a resilient flange that is larger than the aperture and through deformation is operable to engage and seal the aperture.

8. The door module of claim 7, wherein at least one of:

the sealing element is formed from a thermoplastic elastomer; and the base is formed from nylon.

* * * * *